3,382,092
PROTECTIVE COATING FOR VEHICLE BOTTOM
Stephan Ilnyckyj and George A. Holder, Sarnia, Ontario, Canada, assignors to Esso Research and Engineering Company, a corporation of Delaware
No Drawing. Filed Feb. 20, 1964, Ser. No. 346,085
2 Claims. (Cl. 117—97)

ABSTRACT OF THE DISCLOSURE

Metal is coated with a solution of ethylene-vinyl acetate copolymer dissolved in solvent to prevent corrosion.

---

The present invention is concerned generally with a unique protective coating for metals. The invention is more specifically concerned with an article of manufacture which comprises in combination a metallic plate coated with a protective copolymer which comprises ethylene and vinyl acetate. A specific adaptation of the present invention is a metallic element coated with said polymer which element is adapted to be used on the bottom surfaces of vehicles such as cars, trucks and the like.

In the art it is well known to apply protective coatings to prevent metal corrosion. One well-known example of such use is the undercoating of cars in order to prevent the corrosion and erosion of the metal from salt, water and the like. Many types of coatings have been suggested, and many problems have been encountered. It is essential that the structural element have a strong bond between the metal and the coating so as to prevent the separation of the protective coating from the metal. It is also essential that the coating per se be strongly resistant to chemical reactions with salt water and various chemicals to which it is subjected. It is also essential that the coating per se be highly resistant to abrasive action and erosive action to which it is subjected by the impingement of particles such as pebbles, stones and the like. Thus the present invention is concerned with a highly resistive structural element which comprises in combination a metal having adhered to at least one surface thereof a particular copolymer of ethylene and vinyl acetate.

The copolymer with which the present invention is concerned is broadly described in U.S. Patent 3,048,479, entitled, "Ethylene-Vinyl Ester Pour Depressant for Middle Distillates," issued Aug. 7, 1962, inventors: Stephan Ilnyckyj and Charles B. Rupar. In essence, the copolymer comprises an ethylene-vinyl acetate copolymer. It is preferred that the parts by weight of vinyl acetate in the copolymer be in the range from about 15-80% by weight, preferably in the range from about 25-50% by weight. The molecular weight of the copolymer should be in the range from about 2000 to 20,000, preferably in the range from about 3000 to 12,000. The copolymer is prepared in the manner as described in U.S. Patent 3,093,623 entitled, "Process for the Manufacture of Improved Pour Depressants for Middle Distillates," issued June 11, 1963, inventor: Stephan Ilnyckyj. In accordance with the present invention, the copolymerization process is conducted in a solvent as, for example, toluene or hexane. It is preferred, however, to use a benzene solvent. The initiator comprises any peroxy compound, preferably di-tertiary-butyl-peroxide. The temperature of the copolymerization reaction is in the range from about 250° to 340° F. A very desirable temperature is in the range of about 270° to 300° F. The pressure is in the range from about 700 to 2000 pounds, preferably 800 or 900 pounds. The autoclave or similar equipment containing the solvent, initiator and vinyl acetate is purged with nitrogen, then with ethylene before charging with a sufficient amount of ethylene to yield the desired pressure when heated to the reaction temperature. During the copolymerization, additional ethylene is added to maintain the pressure at the desired level. Polymerization is considered complete when the pressure drops less than 50 p.s.i.g. per hour. The product is stripped free of solvent and unreacted vinyl acetate under vacuum.

In accordance with the present invention, hydrolyzed copolymers may also be utilized. The hydrolyzed copolymers are prepared by hydrolysis or alcoholysis of the said ethylene-vinyl acetate copolymers. Hydrolysis may be by saponification with aqueous alkali such as sodium hydroxide or potassium hydroxide. Alcoholysis may be carried out by treatment with alkali, e.g. sodium or potassium hydroxide, in methyl alcohol.

In order to further illustrate the invention, a number of tests were carried out wherein metallic structural elements were tested in order to determine their resistance toward corrosion. These tests were as follows:

Example 1

TABLE I.—AUTOMOTIVE RUSTING TEST

Steel plates size 2½" x 4" cut from a Chevrolet rocker panel were coated with the rust preventative solutions [2] by spraying and attached to the undersurfaces of two test vehicles.

Surface gloss measurements [1]:
    Unexposed metal—gloss 97.5
    (Car mileage 1,898 during 4-month period)

| Coating: | Gloss [1] |
|---|---|
| None | 0.3 |
| Commercial undercoating grease [3] | 52.0 |
| Copolymer solution [2] | 71.3 |

[1] Measured using a Photovolt Photoelectric Gloss Meter manufactured by Photovolt Corp., 95 Madison Ave., New York. Reflectance angle 60°. The instrument is designed to measure the gloss of painted or metallic surfaces, etc., and changes in gloss as a result of age, wear, abrasion, exposure, etc. The gloss of the metal surface was measured after washing off the coating with solvent. The lower the gloss reading, the more the metal surface had been stained by corrosion.

[2] Composition:     Wt. percent
  Ethylene-vinyl acetate copolymer, 27 wt. percent
    vinyl acetate, 2000 mol. wt. _____ 73.0
  Naphtha, boiling range 150–200° F. _____ 25.5
  Barium dinonyl naphthalene sulphonate _____ 1.46
Coating applied by spraying to a thickness of 200 mgm./in.[2].

[3] Applied by spraying—thickness 500 mgm./in.[2]:  Percent
  Low cold test distillate _____ 66.7
  Powdered graphite _____ 14.0
  Fleshing grease _____ 7.9
  Animal fatty acids _____ 5.3
  Butyl Cellosolve _____ 3.0
  Hydrated lime _____ 2.1
  Water _____ 1.0

From the preceding it is apparent that the copolymer solvent of the present invention produces results far superior to those from a commercial undercoating grease.

EXAMPLE 2

A number of additional tests were carried out to determine the salt water rusting resistance of treated plates. These results are shown in the following Table II.

TABLE II.—35 DAY SALT WATER RUSTING TEST [1]

| Coating | Wt., Steel Plate, gm. | | Wt., Coating, gm. | Wt., Steel Plate after exposure and removal of coating, gm. | Loss in wt. gm. | Gloss [2] |
|---|---|---|---|---|---|---|
| | Clean | After Coating | | | | |
| None | 47.060 | | | 45.865 | 1.20 | 8.0 |
| 64 wt. percent copolymer containing 2 wt. percent NaSul* in naphtha, boiling range 150–200° F | 47.484 | 52.178 | 4.7 | 47.412 | 0.072 | 91.5 |
| 64 wt. percent copolymer in naphtha boiling range 150–200° F | 47.437 | 52.241 | 4.8 | 47.34 | 0.098 | 89 |
| Undercoating Grease containing 2 wt. percent NaSul* | 47.664 | 55.461 | 7.8 | 47.487 | 0.18 | 69 |

[1] Steel Plates size 2½″ X 4″ cut from a Chevrolet rocker panel were coated with the copolymer solution described in Example 1 by dipping and with a commercial undercoating grease by spraying. After hanging for ½ hr. in air to evaporate the volatile naphtha solvent and leave only the copolymer coating, the plates were then suspended in constantly aerated 10 wt. percent common salt solution for five weeks.
[2] The unexposed metal had a surface gloss of 97.5.
*Barium Dinonyl Naphthalene Sulphonate From the preceding it is apparent that the structural unit of the present invention comprising the copolymer in combination with a steel substrate is far superior to other materials.

What is claimed is:

1. A method of protecting the bottom metallic surfaces of vehicles such as cars and trucks against corrosion, which comprises applying to said surfaces a hydrocarbon solution consisting essentially of a volatile liquid hydrocarbon solvent and a copolymer consisting essentially of 25 to 50 wt. percent vinyl acetate and ethylene, said copolymer having a molecular weight of 200 to 20,000, and allowing said solution to air dry at ambient temperatures to thereby allow said solvent to evaporate to leave a film of said copolymer on said surfaces.

2. A method according to claim 1, wherein about 0.5 to 3 wt. percent of barium dinonyl naphthalene sulfonate is incorporated in said hydrocarbon solution, and said solvent in naphtha.

References Cited

UNITED STATES PATENTS

| 2,200,429 | 5/1940 | Perrin et al. | 260—80 |
| 2,406,039 | 8/1946 | Roedel | 117—132 |
| 2,703,794 | 3/1955 | Roedel | 260—87.3 |
| 3,048,479 | 8/1962 | Ilnyckyj et al. | 44—62 |
| 3,093,623 | 6/1963 | Ilnyckyj et al. | 260—87.3 |
| 3,154,510 | 10/1964 | Bryan et al. | 117—132 X |
| 3,215,678 | 11/1965 | Adelman | 117—132 X |
| 3,256,228 | 6/1966 | Tyran | 117—132 X |
| 3,258,319 | 6/1966 | Cox | 117—132 X |

RALPH S. KENDALL, *Primary Examiner.*